(12) United States Patent
O'Rourke et al.

(10) Patent No.: US 7,641,952 B2
(45) Date of Patent: Jan. 5, 2010

(54) DURABLE METALLIZED SELF-ADHESIVE LAMINATES

(75) Inventors: Barbara Klimowicz O'Rourke, Newark, DE (US); James Dean Katsaros, Midlothian, VA (US); Ioannis V. Bletsos, Midlothian, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 388 days.

(21) Appl. No.: 11/706,640

(22) Filed: Feb. 13, 2007

(65) Prior Publication Data

US 2007/0196610 A1 Aug. 23, 2007

Related U.S. Application Data

(60) Provisional application No. 60/775,052, filed on Feb. 21, 2006.

(51) Int. Cl.
*B32B 9/00* (2006.01)
*B32B 33/00* (2006.01)

(52) U.S. Cl. .............. 428/40.1; 428/40.3; 428/40.9; 428/41.1; 428/41.5

(58) Field of Classification Search .............. 428/40.1, 428/40.3, 40.9, 41.1, 41.5; 204/192.1, 192.14, 204/192.15
See application file for complete search history.

(56) References Cited

U.S. PATENT DOCUMENTS

| | | | |
|---|---|---|---|
| 3,081,519 A | 3/1963 | Blades et al. | |
| 3,169,899 A | 2/1965 | Steuber | |
| 3,227,784 A | 1/1966 | Blades et al. | |
| 3,260,778 A | 7/1966 | Walton | |
| 3,416,192 A | 12/1968 | Packard | |
| 3,810,280 A | 5/1974 | Walton et al. | |
| 3,851,023 A | 11/1974 | Brethauer et al. | |
| 4,090,385 A | 5/1978 | Packard | |
| 4,717,329 A | 1/1988 | Packard et al. | |
| 4,816,124 A | 3/1989 | Manabe et al. | |
| 4,999,222 A | 3/1991 | Jones et al. | |
| 6,083,628 A | 7/2000 | Yializis | |
| 6,479,119 B1 | 11/2002 | Simpson | |
| 2003/0089552 A1 | 5/2003 | Sahwnch | |
| 2004/0028931 A1 | 2/2004 | Bletsos et al. | |
| 2006/0004091 A1 | 1/2006 | Ackermann et al. | |
| 2006/0008389 A1 | 1/2006 | Sacherer et al. | |
| 2006/0013726 A1 | 1/2006 | Munenaka | |
| 2007/0016652 A1 | 1/2007 | Citu et al. | |
| 2007/0037465 A1 | 2/2007 | Nutz et al. | |

FOREIGN PATENT DOCUMENTS

WO WO 98/18852 5/1998
WO WO 01/81689 A2 11/2001

*Primary Examiner*—Patricia L Nordmeyer

(57) ABSTRACT

A self-adhesive laminate with an emissivity of no greater than about 0.40 made of a sheet layer having first and second outer surfaces, the sheet layer comprising at least one layer selected from the group consisting of nonwoven fabrics, woven fabrics, nonwoven fabric-film laminates, woven fabric-film laminates, films, paper-film laminates, and composites thereof with at least one multi-layer coating on said first outer surface of the sheet layer, said multi-layer coating comprising a first metal coating layer adjacent the first outer surface of the sheet layer; and an outer organic coating layer of a composition containing a material selected from the group consisting of organic polymers, organic oligomers, compounds, and combinations thereof, deposited on the metal layer; and with an adhesive layer coating the second outer surface of the sheet layer and wherein the sheet layer coated with said multilayer coating is creped.

22 Claims, No Drawings

DURABLE METALLIZED SELF-ADHESIVE LAMINATES

BACKGROUND OF THE INVENTION

1. Field of the Invention

The present invention relates to a self-adhesive laminate including a metallized sheet and an adhesive layer for use in flashing applications to prevent water intrusion through openings in building structures such as windows and doors.

2. Description of the Related Art

Self-adhesive laminates that include a metallized sheet and an adhesive layer (also referred to herein as "metallized self-adhesive laminates") that are suitable for use as flashing materials to seal fenestrations such as windows and doors in building construction are known. U.S. Pat. No. 6,479,119 to Simpson discloses a self-adhesive laminate for sealing window frames that includes a reflective aluminum layer, a polyester layer having a low degree of elasticity adhered to one side of the aluminum layer, and an adhesive layer covered by a release paper adhered to the other side of the aluminum layer.

It has been found in practice that flashing materials often need to be repositioned subsequent to initial installation. The flashing materials may need to be repositioned as a result of various factors, such as shifting of the flashing after installation or incorrect installation that must be corrected. Known metallized self-adhesive laminates have poor durability due to insufficient strength and delamination resistance, making it difficult for the laminates to be repositioned subsequent to initial installation without tearing or delamination.

It would be desirable to have a durable metallized self-adhesive laminate for use as a flashing material capable of being repositioned without tearing or compromising the seal against moisture intrusion provided by the laminate.

BRIEF SUMMARY OF THE INVENTION

In one embodiment, this invention is self-adhesive laminate comprising a sheet layer having first and second outer surfaces, the sheet layer comprising at least one layer selected from the group consisting of nonwoven fabrics, woven fabrics, nonwoven fabric-film laminates, woven fabric-film laminates, films, paper-film laminates, and composites thereof with at least one multi-layer coating on said first outer surface of the sheet layer, said multi-layer coating comprising a first metal coating layer adjacent the first outer surface of the sheet layer; and an outer organic coating layer of a composition containing a material selected from the group consisting of organic polymers, organic oligomers, compounds, and combinations thereof, deposited on the metal layer; an adhesive layer coating the second outer surface of the sheet layer; and an optional release layer overlying the adhesive layer on the side of the adhesive layer opposite the sheet layer.

This invention also includes flashing material made from the self-adhesive laminate and methods for applying the flashing

DETAILED DESCRIPTION OF THE INVENTION

The terms "nonwoven fabric", "nonwoven sheet", "nonwoven layer", and "nonwoven web" as used herein refer to a structure of individual strands (e.g. fibers, filaments, or threads) that are positioned in a random manner to form a planar material without an identifiable pattern, as opposed to a knitted or woven fabric. The term "fiber" is used herein to include staple fibers as well as continuous filaments. Examples of nonwoven fabrics include meltblown webs, spunbond nonwoven webs, flash spun webs, staple-based webs including carded and air-laid webs, spunlaced webs, and composite sheets comprising more than one nonwoven web.

The term "plexifilamentary" as used herein, means a three-dimensional integral network or web of a multitude of thin, ribbon-like, film-fibril elements of random length and with a mean film thickness of less than about 4 microns and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network. A nonwoven web of plexifilamentary film-fibril elements is referred to herein interchangeably as a "flash spun plexifilamentary sheet" and a "plexifilamentary film-fibril sheet." An example of a plexifilamentary film-fibril structure is flash spun polyolefin sheet sold under the trade name Tyvek® by E. I. du Pont de Nemours and Company, Wilmington, Del. (hereafter DuPont).

One embodiment of the present invention relates to a metallized self-adhesive laminate suitable for use as a flashing material for sealing fenestrations, such as windows, doors, skylights, vents, utility supply boxes, and other items that are made to fit in openings in structures, such as buildings. The flashing material can be used as an integral component in a system including a water-resistive barrier sheet material covering a building to protect the building from the intrusion of water. The laminate includes a sheet layer coated by at least one multilayer coating on one surface of the sheet layer, the multilayer coating comprising a metal coating layer and an outer organic coating layer, the laminate further comprising an adhesive layer coating on the other surface of the sheet layer. The coated sheet layer, as coated by the at least one multilayer coating, is preferably creped prior to the coating of the adhesive layer coating. The multilayer coating is highly durable and resistant to flaking or peeling during the creping process or wearing off during use. The metallized self-adhesive laminate optionally further comprises a release paper overlying the adhesive layer coating.

Suitable sheet layers for use in the invention, also referred to as "starting sheet layers," include woven fabrics, such as sheets of woven fibers or tapes, or nonwoven fabrics, such as flash-spun plexifilamentary sheets, spunbond nonwoven sheets, spunbond-meltblown nonwoven sheets, spunbond-meltblown-spunbond nonwoven sheets, films including porous, microporous, microperforated and nonporous films, laminates that include a nonwoven or woven fabric, scrim or paper and a film, and composites thereof. The starting sheet layer can comprise a sheet that has been coated using conventional coating methods. For example, sheets currently used in the construction industry include sheets of woven tapes that have been coated with a polymeric film layer and optionally microperforated. The sheet layer may be formed from a variety of polymeric compositions. For example, sheets used in the construction industry are typically formed from polyolefins such as polypropylene or high density polyethylene, polyesters, or polyamides.

In one embodiment, the sheet layer is a flash spun plexifilamentary polyolefin sheet such as Tyvek® flash spun high density polyethylene, available from DuPont. Suitable flash spun plexifilamentary film-fibril materials may also be made from polypropylene or other thermoplastic materials, such as polyester. The sheet layer can be a laminate of a flash spun plexifilamentary sheet with one or more additional layers, such as a laminate comprising a flash spun plexifilamentary sheet and a melt-spun spunbond sheet. Flash spinning processes for forming web layers of plexifilamentary film-fibril strand material are disclosed in U.S. Pat. No. 3,081,519 (Blades et al.), U.S. Pat. No. 3,169,899 (Steuber), U.S. Pat. No. 3,227,784 (Blades et al.), U.S. Pat. No. 3,851,023 (Brethauer et al.), the contents of which are hereby incorporated by reference.

The multilayer coating is formed as follows. The metal coating layer is deposited on one surface of the sheet layer. Metals suitable for forming the metal coating layer(s) of the composite sheets of the present invention include aluminum, silver, gold, copper, tin, zinc, silicon, scandium, titanium, vanadium, chromium, manganese, cobalt, nickel, yttrium, zirconium, niobium, molybdenum, indium and their alloys. The metal alloys can include other metals, so long as the alloy composition provides a low emissivity laminate. Each metal coating has a thickness between about 15 nm and 200 nm, or even between about 30 nm and 60 nm. If the metal coating is too thin, the desired thermal barrier properties will not be achieved. If the metal coating is too thick, it can crack and flake off. In one embodiment, the metal coating comprises aluminum. The metal coating is deposited in vacuum by resistive evaporation, electron beam metal vapor deposition, or sputtering.

An outer organic coating layer of a composition containing a material selected from the group consisting of organic polymers, organic oligomers, compounds, and combinations thereof, the outer organic coating layer having a thickness between about 0.2 µm and about 5 µm is then formed on the surface of the metal coating layer. The outer organic coating may be formed by known techniques including vapor deposition in vacuum, flexographic printing, gravure coating, or air knife coating. The metal coating layer and the outer organic coating layer can be formed in a continuous vapor deposition process in a vacuum chamber, as described in copending U.S. patent application Ser. No. 10/924,218, filed Aug. 23, 2004, incorporated herein by reference in its entirety. In this process, the metal layer(s) and the polymeric coating(s) are deposited on a moisture vapor permeable sheet under vacuum, such that the polymeric coating is formed directly over the freshly deposited metal layer and no opportunity is available for metal oxide form on the metal layer. The composite sheet products formed are useful as thermal and electromagnetic radiation barriers in building construction in the form of housewrap or roof lining.

In one embodiment of the invention, an intermediate organic coating layer is applied to the sheet layer before the metal coating layer is deposited in order to smooth the microroughness of the surface of the sheet layer, thereby improving its emissivity. The intermediate organic coating layer comprises a composition containing a material selected from the group consisting of organic polymers, organic oligomers, compounds, and combinations thereof. The intermediate organic coating layer has a thickness between about 0.02 µm and about 2 µm.

The multilayer coating optionally further comprises a metal oxide coating layer on the surface of the metal layer, formed according to either of the processes of copending U.S. application Ser. Nos. 11/201,787 and 11/334,211 incorporated herein by reference in their entireties. The metal oxide coating layer protects the metal layer from corrosion. The metal oxide coating layer is preferably less than about 10 nm.

An adhesive coating layer is adhered to the opposite side of the sheet layer from the multilayer coating, i.e., the side not coated with the multilayer coating. The adhesive layer contains an adhesive selected from the group consisting of butyl rubber, polyisobutylene, rubberized asphalt, bitumen, acrylic, and ethylene propylene rubbers and hot melt adhesives. The adhesive layer is preferably a butyl rubber. The thickness of the adhesive layer depends on the specific adhesive used. An optional release layer is applied adjacent the adhesive layer, and removed before use, i.e., immediately before installing the laminate in the building fenestration. The adhesive layer provides a durable seal that provides protection from water intrusion.

The metallized self-adhesive laminates of the present invention include the following structures: Adhesive/Sheet/M/L2, Adhesive/Sheet/L1/M/L2, Adhesive/Sheet/M/MO/L2, Adhesive/Sheet/L1/M/MO/L2, and Adhesive/Sheet/L1/M/L2/M/MO/L3, etc., where Adhesive is an adhesive layer, Sheet is a sheet layer (also referred to herein as the starting sheet), M is a low emissivity metal coating, L1, L2, and L3 are organic coatings comprising an organic polymer, organic oligomer, or combinations thereof, and MO is a metal oxide coating. The abbreviation "L1" is used herein to refer to an optional intermediate organic coating that can be deposited on a surface of the sheet layer prior to depositing a metal coating thereon.

The metallized self-adhesive laminates of the invention that include a metal oxide layer preferably include an "outer" organic coating overlying the metal oxide coating MO, such as L2 and L3 in the above-described structures. In laminate structures having more than one metal coating, individual metal coatings can be formed from the same or different metals and can have the same or different thicknesses. Similarly, in laminate structures having more than one organic coating, the individual organic coatings can have the same or different composition and/or thickness. Each metal coating can be adjacent to one or more metal coatings wherein the metal can be the same or different. Similarly, each organic coating can be adjacent one or more organic coatings, wherein the adjacent organic coatings can be the same or different.

The thickness of the metal and organic coatings are preferably controlled within ranges that provide a laminate having an emissivity no greater than about 0.40, even no greater than about 0.20, and even no greater than about 0.15. The thickness and the composition of the outer organic coating are selected such that it does not significantly increase the emissivity of the metallized sheet. The highly reflective, low emissivity metallized surface of the laminate reflects infrared radiation or transmits little infrared radiation. When used to seal a fenestration frame to a wall section in which the wall is covered with a low emissivity thermal barrier, the use of such a flashing material reduces energy loss and keeps the building cooler in the summer and warmer in the winter. The low emissivity of the flashing material keeps the adhesive layer cooler in the summer and warmer in the winter, and protects the flashing material, including the adhesive layer, from degradation. The composition of the outer organic coating has a low infrared absorption in order to minimize the emissivity of the laminate. The outer organic coating preferably has a thickness between about 0.2 µm and about 5 µm. Suitable coating processes for forming the outer and optional intermediate organic coatings are further described in U.S. Patent Publication No. 2004-0028931-A1, filed Jun. 19, 2003, incorporated herein by reference in its entirety.

The sheet layer coated with the multilayer coating is preferably creped prior to the application of the adhesive coating layer. Creped self-adhered flexible flashing products are known, and include Protecto Flex™ produced by Protecto Wrap Company (Denver, Colo.), and Contour™ flexible tape produced by Ludlow Coated Products (Doswell, Va.). These products comprise a creped film laminated to a bulk adhesive layer. The creped sheet layer provides the laminate with increased elongation which results in reduced stress on the sheet layer in use. A stretchable microcreped flashing material comprising a microcreped sheet, the sheet selected from films, nonwovens, papers, and combinations thereof, and a pressure-sensitive adhesive layer bonded to the microcreped sheet, wherein the microcreped sheet has a compaction ratio of at least 55% and the flashing material has a recovery of less than about 50% is disclosed in copending application Ser. No. 10/966,120.

An apparatus and process for creping the sheet is described in U.S. Pat. Nos. 3,260,778; 3,416,192; 3,810,280; 4,090,385; and 4,717,329, hereby incorporated by reference. The creping process employed may be the microcreping process commercially available from the Micrex Corporation of Walpole, Mass., referred to by the registered mark of the same company as "MICREX."

It has been found that laminates in which the coated sheet layer is creped do not form creases or wrinkles through the thickness of the laminate, i.e., in the coated sheet and the adhesive layer, and extending across the width of the laminate. By contrast, creases do form across the width of the laminate when the coated sheet layer is not creped. The creases form when the laminate is rolled into the roll form in which such laminates are typically wound at the end of the laminate-formation process and in which the laminates are transported. It has been surprisingly found that laminates of the invention in which the sheet layer coated with the multilayer coating is creped have an emissivity no more than twice the emissivity of the sheet coated with the multilayer coating prior to creping.

Suitable compositions for the polymeric coating(s) include polyacrylate polymers, oligomers and compounds, and vinyl polymers, oligomers and compounds, such as those described in U.S. Pat. No. 6,083,628 and WO 98/18852, incorporated herein by reference in their entireties. The outer organic coating layer can contain cross-linked polyacrylates or fluorinated acrylate oligomers.

The thermal barrier properties of a material can be characterized by its emissivity. Emissivity is a measure of the heat absorbance and reflectance properties of a material and is measured according to ASTM C1371-98, and ASTM C408-71 using a Model AE D&S Emissometer (manufactured by Devices and Services Company, Dallas, Tex.) with the metallized side of the sheet samples facing the radiation source. Emissivity is the ratio of the power per unit area radiated by a surface to that radiated by a black body at the same temperature. A black body therefore has an emissivity of one and a perfect reflector has an emissivity of zero. The lower the emissivity, the higher the thermal barrier properties.

The tensile properties of the metallized self-adhesive laminate of the invention can be characterized by its tensile strength (as used herein, "tensile strength" refers to tensile strength in the machine direction). The laminate of the invention has excellent durability and resistance to tearing during use, as a result of a tensile strength in the machine direction of at least 30 N/cm, even at least 35 N/cm, and even at least 40 N/cm.

The metallized self-adhesive laminate of the invention is especially suitable for use as a flashing material for sealing a fenestration frame, such as a window frame, in a wall section of a building. The fenestration frame can have a surrounding flange installed ("flanged") or it may be non-flanged. If the fenestration frame is flanged, the flashing material is installed by removing the optional release layer to expose the adhesive layer and applying the adhesive layer flashing material in overlying and sealing relationship to the flange of the fenestration frame and the surface of the adjacent wall section to seal a seam formed by an edge of the frame and adjacent surface of the wall section with the adhesive layer engaging the flange of the window frame and the adjacent wall section with the multilayer coating facing outwardly relative to the adhesive layer. If the fenestration frame is non-flanged, the flashing material of the invention can be used to form a self-adhered flange which can be installed by the methods described in copending U.S. patent application Ser. No. 11/011,669, incorporated herein by reference in its entirety.

Advantageously, the wall section is covered with a water-resistive barrier underlying the fenestration flange. The water-resistive barrier covering the wall can be a metallized sheet selected from the group consisting of nonwoven fabrics, woven fabrics, films, nonwoven fabric-film laminates, woven fabric-film laminates, and composites thereof.

Another embodiment of the present invention relates to a construction barrier suitable for use as a barrier material in building construction, such as a house wrap or roofing underlay, which prevents the intrusion of water into a building while preferably allowing water vapor to escape to the exterior of the building. The construction barrier includes a sheet layer coated by at least one multilayer coating on one surface of the sheet layer, the multilayer coating comprising a first metal coating layer having a thickness between about 15 nm and about 200 nm adjacent the surface of the sheet layer and an outer organic coating layer having a thickness between about 0.2 µm and about 5 µm deposited on the metal layer, as described herein in previous embodiments of the self-adhesive laminate. The construction barrier can include an intermediate organic coating layer located between the sheet layer and the first metal coating layer. The sheet layer coated by the multilayer coating is subsequently creped. The resulting creped construction barrier material contains channels in which moisture can collect and drain when used as a house wrap or roofing underlay. The multilayer coating is highly durable and resistant to flaking or peeling during the creping process or to wearing off during use.

The construction barrier of the invention has an emissivity of no greater than about 0.40. As a result of the low emissivity, the construction barrier can function as a thermal barrier as well as a shield from electromagnetic frequency radiation (EMF) when installed as house wrap and/or roof lining.

TEST METHODS

In the non-limiting examples that follow, the following test methods were employed to determine various reported characteristics and properties. ASTM refers to the American Society of Testing Materials. ISO refers to the International Standards Organization. TAPPI refers to Technical Association of Pulp and Paper Industry.

For Examples using sheet layers in roll form, three samples (S1, S2, and S3) were taken from the beginning, middle, and end of each roll and multiple measurements made on each of these samples and averaged for hydrostatic head, Gurley Hill Porosity, MVTR, and emissivity measurements.

Basis weight (BW) was determined by ASTM D-3776, which is hereby incorporated by reference and reported in $g/m^2$.

Hydrostatic head (HH) was measured using ISO 811, which is hereby incorporated by reference and is reported in cm of water. This test measures the resistance of a sheet to the penetration of liquid water under a static load. A 100 $cm^2$ sample is mounted in a Shirley Hydrostatic Head Tester (manufactured by Shirley Developments Limited, Stockport, England). Water is pumped against one side of the sample until three points of leakage appear on the surface. The hydrostatic head was measured for a total of 18 samples for each Example and the measurements averaged to obtain the average HH reported in the Examples.

Gurley Hill Porosity is a measure of the barrier of the sheet material for gases. In particular, it is a measure of how long it takes for a volume of gas to pass through an area of material wherein a certain pressure gradient exists. Gurley-Hill porosity is measured in accordance with TAPPI T-460 om-88 using a Lorentzen & Wettre Model 121D Densometer. This test measures the time of which 100 cubic centimeters of air is pushed through a 2.54 cm diameter sample under a pressure of approximately 12.45 cm of water. The result is expressed in seconds and is usually referred to as Gurley Seconds. The Gurley Hill Porosity was measured for a total of 18 samples for each Example and the measurements averaged to obtain the average Gurley Seconds reported in the Examples.

Emissivity is a measure of the heat absorbance and reflectance properties of a material and was measured according to ASTM C1371-98 and ASTM C408-71 using a Model AE D&S Emissometer (manufactured by Devices and Services Company, Dallas, Tex.) with the metallized side of the sheet samples facing the radiation source. The detector was heated to 82° C. and calibrated with standards having a low emissivity (reflective, emissivity=0.07) and high emissivity (absorbing, emissivity=0.89). The instrument was calibrated at the beginning and end of each measurement and at least once every 30 minutes. The emissivity was measured for a total of 27 samples for each Example and the measurements were averaged to obtain the average emissivity reported in the Examples. Three emissivity measurements were obtained from each of three areas, close to both edges and the center of the roll width for each S1, S2, and S3 sample. The same measurements were repeated three times, each time with a new S1, S2, and S3 for a total of 27 emissivity measurements that were averaged to obtain the average emissivity reported in the Examples.

Moisture Vapor Transmission Rate (MVTR) is a measure of the moisture vapor permeability of a material and was measured according to ASTM F1249, which is hereby incorporated by reference, under the conditions of 23° C. and 85% Relative Humidity, and is reported in units of g/m²/24 hr. The MVTR was measured for a total of 9 samples for each Example and the measurements averaged to obtain the average MVTR reported in the Examples.

Tensile Strength is a measure of breaking strength and was measured according to ASTM D5035-90, hereby incorporated by reference.

Thickness of vapor deposited polymeric layers and metal layers was measured on cryomicrotomed specimens using transmission electron microscopy.

UV Resistance was determined using xenon arc UV testing according to SAE J1960.

EXAMPLES

The abbreviations defined below are used in the Examples that follow:

HW=Tyvek® 1580B having a nominal basis weight of 84 g/m² basis weight and a thickness of 222 μm.

HWM=Tyvek® Reflex® 3480M house wrap having a nominal basis weight of 84 g/m² basis weight and a thickness of 222 μm. Tyvek® Reflex® 3480M house wrap is metallized with a 36 nm thick aluminum layer and coated with a 1.5 g/m² organic lacquer coating using flexographic printing techniques, and has a composite optical density of 2.5.

CW=Tyvek® 1162B CommercialWrap® having a nominal basis weight of 82 g/m² basis weight and a thickness of 180 μm.

Tyvek® 1580B, Tyvek® Reflex® 3480M and Tyvek® 1162B CommercialWrap® are available from DuPont.

Monomer/Oligomer Composition:

SR606=reactive polyester diacrylate

SR9003=propoxylated neopentylglycol diacrylate

SR606 and SR9003 are commercially available from Sartomer Company (Exton, Pa.).

Examples 1-4 and Comparative Examples A-C

Roll samples (460 m long by 41 cm wide) of CW were coated with SR606 or SR9003 layers and metallized with aluminum in a vacuum coating/metallization machine to form working examples 1-4 as listed in Table 1. "Al" indicates an aluminum layer, and "L1" and "L2" represent individual layers of SR606 or SR9003.

The vacuum chamber of the vacuum coating/metallization machine included a plasma treatment station, a vapor deposition station, and a metallization station, such as described in co-pending U.S. patent application Ser. No. 10/924,218. The coated samples were prepared in two or three steps, depending on the number of layers deposited.

In the first step, a roll of uncoated sheet layer was placed in an unwind position in the vacuum chamber, which was open to the atmosphere. After splicing with a polypropylene film leader, the substrate was threaded from the unwind position through the machine to a wind-up position. The vacuum chamber was then closed and evacuated to $10^{-2}$-$10^{-3}$ Torr. The roll was unwound at 91 m/min and one surface of the sheet layer was exposed to $Ar/N_2$ (80/20) plasma at 300 W power. Immediately following the plasma treatment, the acrylate monomer was flash vaporized and condensed onto the plasma-treated surface of the sheet layer. The monomer vapor was produced in a flash evaporator located outside of the vacuum chamber and was drawn into the vacuum chamber through a heated pipe and a nozzle slit. Upon contact with the surface of the sheet layer, the monomer vapor condensed into a thin liquid layer that was then cured by an electron beam to obtain an acrylate polymer layer approximately 0.5 μm thick on the surface of the fibers. After curing, the vacuum chamber was vented and the roll of polyacrylate-coated sheet layer (Sheet layer/L1) was removed from the vacuum chamber.

In the second step, the coated roll (Sheet Layer/L1) was placed into the unwind position and the chamber was pumped down to $<10^{-4}$ Torr. The coated sheet was unwound at 91 m/min and the acrylate-coated side was plasma treated as in the first step, followed by vacuum metallization with aluminum and immediately thereafter a second layer 0.5 μm thick of the same acrylate was deposited on top of the metal layer and cured to form a coated metallized sheet (Sheet Layer/L1/Al/L2). The sheets were cooled on a cooled drum to between about −15° C. and −20° C. during metallization. Typical monomer feed rates in both the first and second steps were about 14 g/min. The vacuum chamber was then vented and the roll of coated sheet material removed.

Multiple samples were obtained from the beginning, middle, and end of each roll and properties were measured using the test methods described above and compared to their corresponding non-metallized precursor sheets. Property data are reported in Table 1 below for control samples of a sheet layer with no acrylate or metal coating, i.e., Comparative Example A and Examples 1-4 of the invention metallized and coated with SR606 or SR9003 as indicated above. Table 1 also compares the examples of the invention with commercial non-metallized, non-coated sheet (Comparative Example B), and commercial metallized house wrap Reflex® 3480M (Comparative Example C).

TABLE 1

| Example | Structure | Gurley (sec) | MVTR (g/m²/ 24 hrs) | HH (cm H₂O) | Emissivity |
|---|---|---|---|---|---|
| Comp A | CW | 3670 | 1000 | 434 | 0.65 |
| 1 | CW/SR606/Al (36 nm)/SR606 | 3340 | 1040 | 428 | 0.10 |
| 2 | CW/SR606/Al (22 nm)/SR606 | 2650 | 918 | 430 | 0.11 |
| 3 | CW/SR9003/Al (36 nm)/SR9003 | 2950 | 1060 | 426 | 0.10 |
| 4 | CW/SR9003/Al (22 nm)/SR9003 | 2910 | 1020 | 443 | 0.10 |
| Comp B | HW | 191 | 1430 | 225 | 0.64 |
| Comp C | HW/Al/polymer coating | 491 | 900 | 205 | 0.18 |

The data in Table 1 demonstrate that the air permeability, moisture vapor permeability, and hydrostatic head of Examples 1-4 of the present invention (Sheet Layer/L1/Al/L2) were substantially unchanged compared to the Comparative Example A, i.e., the control starting sheet layer. Likewise, the examples of the invention provide significantly better thermal resistance (lower emissivity) than Comparative Example A without significantly impacting the sheet's other barrier properties that are important in use as flashing materials. By contrast, the data in Table 1 reveal that Comparative Example C, having an organic coating covering the metal layer as well as covering some of the interstitial spaces between the fibers of the sheet layer, has a MVTR that is reduced by approximately 37% and a Gurley Hill porosity reduced by approximately 156% as compared to Comparative Example B.

Examples 5-6 and Comparative Examples C-D

Following metallization, the coated rolls were creped using a variety of creping shims up to an 11% compaction ratio using a Micrex Microcreper machine manufactured by Micrex Corporation (Walpole, Mass.). Compaction ratio is calculated as: (uncompacted sheet length-compacted sheet length)/uncompacted sheet length. The creped, coated rolls were then slit to 4 inch wide strips. The creped examples were made from the same material as Examples 1 and 2 above and designated as Examples 5-6, respectively. The strips were subsequently coated with butyl adhesive and a 100 lb release paper to form a flashing material.

One inch by 8 inch samples from Comparative Example A, Example 5 and Example 6 were attached to OSB (oriented strand board). The examples were handled with extreme care. The examples were exposed to xenon arc UV testing according to SAE J1960 for time periods of 7, 14, and 28 days. A single set of samples was not exposed to the xenon arc UV testing. There were 4 replicates of each sample. Visual observation of the samples made using the coated sheets of Examples 5 and 6 revealed little to no signs of degradation of the sheet layer; in fact, as a result of the xenon arc UV testing, the appearance of the samples was unchanged. By contrast, Comparative Example A showed some signs of degradation, such as fraying around the edges of the sheet layer and a blotchy appearance caused by butyl adhesive showing through the sheet layer. These results indicate that the reflective multilayer coating greatly extends the UV resistance of the flashing material.

The emissivity of Example 1 (before creping) and Example 5 (after creping) were both measured. The reflective metal coating surprisingly not only survived the high nip pressures in the creping process intact, without flaking, but also maintained the low emissivity values present before creping. The emissivity increased from about 0.11 for Example 1 to about 0.15 for Example 5 or a 36% increase.

Likewise, the emissivity of Comparative Example C (before creping) and Comparative Example D (i.e., Comparative Example C after creping) were both measured. By contrast with the degree of emissivity change when Example 1 was creped (Example 5), or a 36% increase, the emissivity increased from about 0.18 for Comparative Example C to about 0.27 for Comparative Example D, or a 50% increase. Therefore the creped samples according to the invention demonstrate significantly better retention of thermal resistance (lower emissivity) than the similarly creped comparative samples.

Example 1 and Comparative Examples E-G

The tensile strength of 1-inch by 8-inch samples from Example 1; Tyvek® StraightFlash™ (available from DuPont), designated as Comparative Example E; Window Wrap™ (available from MFM Building Products Corp., Coshocton, Ohio), designated as Comparative Example F and Pella Flashing Tape (available from Pella, Iowa), designated as Comparative Example G were measured. Six measurements were made per flashing material sample; with the average for each shown in Table 2.

TABLE 2

| Example | Tensile Strength (N/cm) |
|---|---|
| 1 | 59 |
| Comp E | 61 |
| Comp F | 22 |
| Comp G | 20 |

What is claimed is:

1. A self-adhesive laminate comprising:
a sheet layer having first and second outer surfaces, the sheet layer comprising at least one layer selected from the group consisting of nonwoven fabrics, woven fabrics, nonwoven fabric-film laminates, woven fabric-film laminates, films, paper-film laminates, and composites thereof; at least one multi-layer coating on said first outer surface of the sheet layer, said multi-layer coating comprising a first metal coating layer adjacent the first outer surface of the sheet layer; and an outer organic coating layer of a composition containing a material selected from the group consisting of organic polymers, organic oligomers, compounds, and combinations thereof, deposited on the metal layer; an adhesive layer coating the second outer surface of the sheet layer; an optional release layer overlying the adhesive layer on the side of the adhesive layer opposite the sheet layer; and wherein said sheet layer coated with said multilayer coating is creped and the laminate has an emissivity of no greater than about 0.40.

2. The self-adhesive laminate of claim 1, comprising an intermediate organic coating layer of a composition containing a material selected from the group consisting of organic polymers, organic oligomers, compounds, and combinations thereof having a thickness between about 0.02 micrometer and about 2 micrometers located between the first outer surface of the sheet layer and the first metal coating layer.

3. The self-adhesive laminate of claim 1, wherein the self-adhesive laminate shows no substantial degradation after xenon UV testing after 28 days of exposure.

4. The self-adhesive laminate of claim 1, wherein the laminate is substantially free of through-thickness creases.

5. The self-adhesive laminate of claim 1 having an emissivity that is no more than twice the emissivity of a same sheet layer coated with the multilayer coating without creping.

6. The self-adhesive laminate of claim 1 or 2, wherein the multilayer coating further comprises a metal oxide coating layer having a thickness of less than about 10 nm between the first metal coating layer and the outer organic coating layer.

7. The self-adhesive laminate of claim 1 or 2, wherein the sheet layer comprises at least one nonwoven fabric selected from the group consisting of flash spun nonwovens, spunbond nonwovens, and spunbond-meltblown-spunbond nonwovens.

8. The self-adhesive laminate of claim 7, wherein the nonwoven fabric is a flash-spun polyethylene nonwoven.

9. The self-adhesive laminate of claim 1 or 2, wherein the metal of the metal layer is selected from the group consisting of aluminum, silver, gold, copper, tin, zinc, silicon, scandium, titanium, vanadium, chromium, manganese, cobalt, nickel, yttrium, zirconium, niobium, molybdenum, indium, and their alloys.

10. The self-adhesive laminate of claim 1 or 2, wherein the adhesive layer is selected from the group consisting of butyl rubber, polyisobutylene, bitumen, acrylic, hot melt adhesives, ethylene propylene rubbers and rubberized asphalt.

11. The self-adhesive laminate of claim 1 or 2, wherein the first metal coating layer has a thickness between about 15 nm and about 200 nm and the outer organic coating layer has a thickness between about 0.2 micrometer and about 5 micrometers.

12. The self-adhesive laminate of claim 1 or 2, wherein the outer organic coating layer contains a material selected from the group consisting of cross-linked polyacrylates and fluorinated acrylate oligomers.

13. The self-adhesive laminate of claim 1 or 2 having a tensile strength of at least 30 N/cm.

14. A self-adhesive flashing material comprising the self-adhesive laminate of claim 11.

15. In combination with a flange on a building fenestration frame and a wall section adjacent the flange, the self-adhesive flashing material of claim 14 disposed in overlying and sealing relationship of a seam formed by the flange and the adjacent wall section, wherein the adhesive layer engages the flange and the adjacent wall section and wherein the optional release layer is removed to expose the adhesive prior to engaging the flange and adjacent wall section.

16. The combination of claim 15, wherein the wall section is covered with a water-resistant barrier, the water-resistive barrier underlying the fenestration flange.

17. The combination of claim 16, wherein the water-resistive barrier comprises a metallized second sheet layer, the second sheet layer selected from the group consisting of nonwoven fabrics, woven fabrics, films, nonwoven fabric-film laminates, woven fabric-film laminates, and composites thereof.

18. A construction barrier comprising:
a sheet layer having first and second outer surfaces, the sheet layer comprising at least one layer selected from the group consisting of nonwoven fabrics, woven fabrics, nonwoven fabric-film laminates, woven fabric-film laminates, films, paper-film laminates, and composites thereof; at least one multi-layer coating on said first outer surface of the sheet layer, said multi-layer coating comprising a first metal coating layer having a thickness between about 15 nm and about 200 nm adjacent the first outer surface of the sheet layer; and an outer organic coating layer of a composition containing a material selected from the group consisting of organic polymers, organic oligomers, compounds, and combinations thereof, having a thickness between about 0.2 micrometers and about 5 micrometers deposited on the metal layer; wherein said sheet layer coated with said multi-layer coating is creped; wherein the creped construction barrier has an emissivity of no greater than about 0.40.

19. The construction barrier of claim 18, comprising an intermediate organic coating layer of a composition containing a material selected from the group consisting of organic polymers, organic oligomers, compounds, and combinations thereof having a thickness between about 0.02 micrometer and about 2 micrometers located between the first outer surface of the sheet layer and the first metal coating layer.

20. A method for sealing a building fenestration frame provided with a surrounding flange installed in a wall section of a building comprising the steps of:
a) providing a self-adhesive flashing material according to claim 15, wherein the optional release layer is removed to expose the adhesive layer;
b) applying the self-adhesive flashing material in overlying and sealing relationship to a portion of the surrounding flange of the fenestration frame and the surface of the adjacent wall section to seal a seam formed by an edge of the frame and adjacent surface of the wall section with the adhesive layer engaging the flange of the window frame and the adjacent wall section with the multilayer coating facing outwardly relative to the adhesive layer.

21. The method of claim 20, wherein the wall section is covered with a water-resistive barrier, the water-resistive barrier underlying the fenestration flange.

22. The method of claim 21, wherein the water-resistive barrier comprises a metallized second sheet layer, the second sheet layer selected from the group consisting of nonwoven fabrics, woven fabrics, films, nonwoven fabric-film laminates, woven fabric-film laminates, and composites thereof.

* * * * *